United States Patent
Kitching et al.

(10) Patent No.: US 10,664,715 B2
(45) Date of Patent: May 26, 2020

(54) COMPUTER-IMPLEMENTED PRINT ANALYSIS

(71) Applicant: University of Wolverhampton, Wolverhampton (GB)

(72) Inventors: Peter Kitching, Wolverhampton (GB); Ian Sillitoe, Wolverhampton (GB)

(73) Assignee: University of Wolverhampton, Wolverhampton (GB)

( * ) Notice: Subject to any disclaimer, the term of this patent is extended or adjusted under 35 U.S.C. 154(b) by 76 days.

(21) Appl. No.: 15/923,681

(22) Filed: Mar. 16, 2018

(65) Prior Publication Data
US 2019/0294908 A1   Sep. 26, 2019

(51) Int. Cl.
*G06K 9/32* (2006.01)
*G06K 9/00* (2006.01)
*G06T 7/73* (2017.01)

(52) U.S. Cl.
CPC .......... *G06K 9/3208* (2013.01); *G06K 9/001* (2013.01); *G06K 9/00073* (2013.01); *G06T 7/74* (2017.01); *G06T 2207/10004* (2013.01); *G06T 2207/20024* (2013.01); *G06T 2207/30196* (2013.01)

(58) Field of Classification Search
CPC .... G06K 9/40; G06K 9/3208; G06K 9/00073; G06K 9/001; G06K 9/4647; G06T 2207/10004; G06T 2207/20024; G06T 2207/30196
USPC ......................................................... 382/125
See application file for complete search history.

(56) References Cited

U.S. PATENT DOCUMENTS

| | | | | |
|---|---|---|---|---|
| 5,901,252 A | * | 5/1999 | Kawakami | G06K 9/4619 345/648 |
| 2007/0047785 A1 | * | 3/2007 | Jang | G06K 9/0008 382/125 |
| 2008/0080757 A1 | * | 4/2008 | Scheuering | A61B 6/032 382/131 |

(Continued)

OTHER PUBLICATIONS

G. Langenburg and C. Champod, "Gyro system—a recommended approach to more transparent documentation," Journal of Forensic Identification, vol. 61, No. 4, p. 373:384, 2011. [Online]. Available: https://www.ncjrs.gov/App/Publications/abstract.aspx?ID=258112 LINK: https://cloud.withersrogers.com/index.php/s/en37bk3TQM2Ra4D Jul. 9, 2010.

(Continued)

*Primary Examiner* — Ali Bayat
(74) *Attorney, Agent, or Firm* — Nexsen Pruet, LLC; Todd A. Serbin

(57) ABSTRACT

A computer implemented method for automatic print analysis, the method comprising: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image, wherein the estimating comprises: applying an orientation operator to the first image, the orientation operator being based on a plurality of isotropic filters lying in quadrature.

13 Claims, 10 Drawing Sheets
(4 of 10 Drawing Sheet(s) Filed in Color)

(56) References Cited

U.S. PATENT DOCUMENTS

| | | | |
|---|---|---|---|
| 2011/0176744 A1* | 7/2011 | Ko | G06T 3/4007 |
| | | | 382/264 |
| 2018/0343421 A1* | 11/2018 | Kahle | G06T 7/70 |
| 2019/0019529 A1* | 1/2019 | Niedermeier | G06F 16/683 |

OTHER PUBLICATIONS

A. K. Jain and J. Feng, "Latent palmprint matching," IEEE Transactions on Pattern Analysis and Machine Intelligence, vol. 31, No. 6, pp. 1032-1047, 2009. LINK: https://cloud.withersrogers.com/index.php/S/cTg9aqjMFodyT35 Jun. 2009.

J. Feng, Y. Shi, and J. Zhou, "Robust and efficient algorithms for separating latent overlapped fingerprints," IEEE Transactions on Information Forensics and Security, vol. 7, No. 5, pp. 1498-1510, 2012. Oct. 5, 2012.

E. H. Holder, L. O. Robinson, and J. H. Laub, The Fingerprint Sourcebook, U.S. Department of Justice, Relevant part is Chapter 5 (p. 72-119); 2011. 2011.

* cited by examiner

COMPUTER-IMPLEMENTED PRINT ANALYSIS

FIELD OF INVENTION

The present invention relates to forensic analysis of prints, in particular to extracting features from images of latent/impressed/patent/actual fingerprints, palm prints, toe prints and footprints.

BACKGROUND

It is known that individuals can be identified by means of prints that are characteristic of that individual. These prints include unique patterns of friction ridges and other features on the surface of the fingers, palms, toes and feet. When discovered, and properly examined, these prints can lead to proof of a person's past location.

A subset of these prints are traces left on objects by the physical interaction of the palm/fingers/etc. Such traces consist of perspiration and oils, due to the excretion of perspiration through pores on the palm and fingers. A variety of forensic techniques exist to recover these traces from different types of objects. These recovered impressions are known as latent prints.

Prints also include impressed prints. Impressed prints are typically physical impressions left in a malleable material, for example an indentation left by a finger.

Another kind of print is a patent print. These prints are typically visible to the naked eye. One example is a finger print left on a surface resulting from the finger having previously been coated with ink or other substance leaving a visible mark.

For the purpose of this document, a print can also include the pattern of features on an actual hand or foot (hereinafter an "actual print"), for example as appearing in a photograph of a person's hand or foot.

Prints can contain a variety of different types of features, which are broadly classified into level I, level II or level III detail. Level I detail includes attributes of friction ridges of the finger/palm/etc., and includes deltas (also known as a triradius), loops, whorls and, in the case of palm prints, vestiges. Level II detail describe minutiae points relating to friction ridges, including end points, bifurcations, ridge units/short friction ridges, and friction ridge islands. Level III detail includes other features, including flexation creases, pores and scars.

Images can be recorded of latent/impressed/patent/actual prints, for example using photography or other image capture means. These images can then be analysed for the purpose of identifying the person to whom the print belongs.

A print which contains sufficient discriminating physical characteristics can be matched to an individual, hence proving that a person held or touched an object on which the print was found, or similarly proving that an actual finger/palm etc. shown in a photograph belongs to that person. To match a print, a print of the original palm or fingers is required. These original prints are known as exemplar prints and are stored in a database. The process of matching a print to an exemplar print (known as latent to full matching in the case of latent print matching) involves individually comparing the print with each of the prints stored in the database, until a match is obtained. However, in practice, owing to the many means of contact between the palm and object and the particular method of acquisition, the quality of an individual print varies dramatically. Therefore, the complexity of the identification of the features and the matching process is not a trivial task.

AFIS (Automatic Fingerprint Identification Systems) and APIS (Automatic Palmprint Identification Systems) are used to automatically find a set of exemplar prints which best match latent prints, resulting in a ranked list of exemplar prints. Known AFIS/APIS techniques typically require any matches to be verified by a human.

One step performed by AFIS/APIS is to determine the orientation of features in the image of a latent print. This orientation is estimated by performing one of a slit based method, a frequency domain method, or a gradient method. However, these methods have disadvantages.

Slit based methods use a pair of orthogonal slits, which are placed at different positions on an image of a latent print. The greyscale values of the print pattern along each slit are measured. The slits are then rotated to a number of different angles, and the greyscale values re-measured. From the variations in greyscale along each of the slits for each of the angles, the orientation of the friction ridge at that point can be determined. This is then repeated across the rest of the image. Slit based methods provide discrete results, which have non-trivial associated errors that are dependent on the angles chosen for orientating the slits during the analysis. Moreover, slit-based methods are computationally complex, thus placing high demands on data processing resources available at computing devices.

Frequency domain methods involve splitting an image of a latent print into discrete blocks, and performing a discrete Fourier transform on each block. The resulting frequency peaks can be used to infer a number of possible orientations within the each of the blocks. As with slit based methods, frequency based methods yield discrete results, and accordingly have an associated error. Moreover, frequency based methods are also computationally complex, and place high demands on data processing resources available at computing devices.

Gradient methods involve calculating the rate of change of features in an image of a latent print in x- and y-directions. Whilst this technique is known to produce good results when applied to good quality palm prints, it is less accurate when analysing areas of low rates of change in images of latent prints.

Standard AFIS/APIS techniques are also typically limited to the analysis of a small subset of the different types of features that make up a latent print, in particular being able to only perform analysis of a subset of level I features.

Accordingly, there is a desire for an improved automatic print analysis.

SUMMARY OF INVENTION

In order to mitigate at least some of the issues above, in a preferred embodiment, there is provided a computer implemented method for automatic print analysis, the method comprising: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image, wherein the estimating comprises: applying an orientation operator to the first image, the orientation operator being based on a plurality of isotropic filters lying in quadrature.

Advantageously, this method provides both improvements in accuracy and improvements in processing efficiency over traditional methods for estimating the orientation of features in a print.

In some embodiments the orientation operator is a spherical quadrature filter, for example a Difference of Gaussian filter, a Gaussian filter, a monogenic signal filter, a phase congruency filter, a Laplacian of Gaussian filter, a Laplacian of Poisson filter, or a Log Gabor filter.

In some embodiments, the method further comprises applying a low magnitude filter configured to remove data for pixels in the orientation field corresponding to level II and level III detail, thereby creating a modified orientation field. The low magnitude filter is optionally based on one or more values, the one or more values calculated based on the orientation field and comprising at least one of: a local weighted circular mean, a circular variance, a skew and a kurtosis. Preferably, the low magnitude filter is configured to remove data in the first image corresponding to portions of the image for which the one or more values exceed one or more predefined thresholds, thereby creating the modified orientation field.

In embodiments in which a low magnitude filter is applied, the method preferably further comprises determining interpolated orientation data for one or more of the pixels in the first image corresponding to level II and level III detail; adding the interpolated orientation data to the modified orientation field, thereby creating an interpolated orientation field. This optionally involves applying G4C and GLCS algorithms to the modified orientation field. Advantageously this process removes less reliable estimates and thus improves the ability to perform automatic print matching based on the determined orientations.

In some embodiments, the method further comprises identifying features by: calculating a circular variance for each of a plurality of points in the orientation field; comparing the calculated circular variances to a predetermined threshold circular variance value; and for each calculated circular variance exceeding the predetermined threshold circular variance value, labelling a point in the first image corresponding to the calculated circular variance exceeding the predetermined threshold circular variance value as a center point of a feature. Once the features have been identified, they can optionally be classified by: determining a number of friction ridges leaving a center point based on a set of orientation estimates immediately surrounding the center point; and if the determined number of friction ridges is 0, classifying the feature as a whorl; if the determined number of friction ridges is 1, classifying the feature as a loop; if the determined number of friction ridges is 3, classifying the feature as a delta. In some examples, the determining a number of friction ridges leaving a center point based on a set of orientation estimates immediately surrounding the center point comprises: performing a circular sweep in the orientation field about the center point to identify one or more pixels of the orientation field having an orientation value parallel to a current orientation of the sweep.

Optionally the method further comprises tracing the path of one or more friction ridges of the feature using the orientation field.

In another embodiment, there is provided a computer implemented method for automatic print matching, the method comprising: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image; calculating a local circular variance for a plurality of locations in the orientation field; for each of the plurality of locations, comparing a corresponding local circular variance to a first plurality of thresholds; defining a plurality of level sets based on the comparing the corresponding local circular variance to the first plurality of thresholds, wherein each level set corresponds to a group of neighbouring locations of the plurality of locations, the neighbouring locations having local circular variances within a range of local circular variances; defining a first tree structure by: i) for each level set falling within a total area of the print, adding a new node to a trunk node; ii) for each new node added to the trunk node, determining a number of level sets falling within a level set corresponding to the new node, and adding a number of further nodes to the new node, the number of further nodes corresponding to the number of level sets; iii) iteratively repeating step ii) for each of the further nodes, until no more further nodes can be added; comparing the first tree to a first plurality of predetermined trees corresponding to a plurality of exemplar prints; and determining whether the print matches any of the exemplar prints based on the comparing the first tree to the first plurality of predetermined trees.

Advantageously, the creation of a tree representing the simplified structure of the print enables matching to be performed using the tree instead of the actual features of the print. This means that significantly less data needs to be analysed during the matching process. This reduction in data load both increases the speed and reduces the demand on processing resources on the computing device implementing the method.

In some embodiments, the method described above for creating trees is repeated, this time using an inverted local circular variance in place of the local circular variance. Thus two different, complementary trees can be created for a print (also referred to as "up" trees and "down" trees), both of which can beneficially be used in the matching process. For example, the method further comprises inverting the calculated local circular variance for a plurality of locations in the orientation field; for each of the plurality of locations, comparing a corresponding inverted local circular variance to a second plurality of thresholds; defining a plurality of additional level sets based on the comparing the corresponding local circular variance to the second plurality of thresholds, wherein each additional level set corresponds to a further group of neighbouring locations of the plurality of locations, the neighbouring locations having inverted local circular variances within a range of inverted local circular variances; defining a second tree structure by: i) for each additional level set falling within a total area of the print, adding an additional new node to an additional trunk node; ii) for each additional new node added to the additional trunk node, determining a number of additional level sets falling within an additional level set corresponding to the additional new node, and adding a number of additional further nodes to the additional new node, the number of additional further nodes corresponding to the number of additional level sets; iii) iteratively repeating step ii) for each of the additional further nodes, until no more additional further nodes can be added; comparing the second tree to a second plurality of predetermined trees corresponding to the plurality of exemplar prints; and determining whether the print matches any of the exemplar prints based on the comparing the second tree to the second plurality of predetermined trees.

In some embodiments, the method for automatic print matching further comprises assigning one or more values to each node, the one or more values indicating at least one of: an absolute area of a corresponding level set; a relative area of the corresponding level set; a type of feature associated with the node.

In some embodiments, the estimating the orientation of one or more features in the first image comprises applying an orientation operator to the first image, the orientation operator being based on a plurality of isotropic filters lying in quadrature, wherein the orientation operator is a spherical quadrature filter.

In embodiments, in which the orientation operator is a spherical quadrature filter, optionally the spherical quadrature filter is one of: a Difference of Gaussian filter, a Gaussian filter, a monogenic signal filter, a phase congruency filter, a Laplacian of Gaussian filter, a Laplacian of Poisson filter, a Log Gabor filter.

In some embodiments, there is also provided a non-transitory computer readable medium storing instructions that, when executed by a processing device, cause the processing device to perform any of the methods above.

For example, in some embodiments, there is provided a non-transitory computer readable medium storing instructions that, when executed by a processing device, cause the processing device to perform automatic print analysis, by: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image, wherein the estimating comprises: applying an orientation operator to the first image, the orientation operator being based on a plurality of isotropic filters lying in quadrature.

In further embodiments, there is provided a non-transitory computer readable medium storing instructions that, when executed by a processing device, cause the processing device to perform automatic print matching, by: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image; calculating a local circular variance for a plurality of locations in the orientation field; for each of the plurality of locations, comparing a corresponding local circular variance to a first plurality of thresholds; defining a plurality of level sets based on the comparing the corresponding local circular variance to the first plurality of thresholds, wherein each level set corresponds to a group of neighbouring locations of the plurality of locations, the neighbouring locations having local circular variances within a range of local circular variances; defining a first tree structure by: i) for each level set falling within a total area of the print, adding a new node to a trunk node; ii) for each new node added to the trunk node, determining a number of level sets falling within a level set corresponding to the new node, and adding a number of further nodes to the new node, the number of further nodes corresponding to the number of level sets; iii) iteratively repeating step ii) for each of the further nodes, until no more further nodes can be added; comparing the first tree to a first plurality of predetermined trees corresponding to a plurality of exemplar prints; and determining whether the print matches any of the exemplar prints based on the comparing the first tree to the first plurality of predetermined trees.

In some embodiments, there is also provided an electronic computing device comprising: a processor; and a memory; wherein the memory stores instructions that when executed by the processor, cause the processing device to perform any of the methods above.

For example, in some embodiments, there is provided an electronic computing device comprising: a processor; and a memory; wherein the memory stores instructions that when executed by the processor, cause the processing device to perform automatic print analysis, by: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image, wherein the estimating comprises: applying an orientation operator to the first image, the orientation operator being based on a plurality of isotropic filters lying in quadrature.

In further embodiments, there is provided an electronic computing device comprising: a processor; and a memory; wherein the memory stores instructions that when executed by the processor, cause the processing device to perform automatic print analysis, by: receiving a first image wherein the first image shows one or more of: a latent print, a patent print, an impressed print, and an actual finger, palm, toe and/or foot; and wherein the first image includes characteristic features of at least one of a finger, a palm, a toe and a foot; creating an orientation field by estimating the orientation of one or more features in the first image; calculating a local circular variance for a plurality of locations in the orientation field; for each of the plurality of locations, comparing a corresponding local circular variance to a first plurality of thresholds; defining a plurality of level sets based on the comparing the corresponding local circular variance to the first plurality of thresholds, wherein each level set corresponds to a group of neighbouring locations of the plurality of locations, the neighbouring locations having local circular variances within a range of local circular variances; defining a first tree structure by: i) for each level set falling within a total area of the print, adding a new node to a trunk node; ii) for each new node added to the trunk node, determining a number of level sets falling within a level set corresponding to the new node, and adding a number of further nodes to the new node, the number of further nodes corresponding to the number of level sets; iii) iteratively repeating step ii) for each of the further nodes, until no more further nodes can be added; comparing the first tree to a first plurality of predetermined trees corresponding to a plurality of exemplar prints; and determining whether the print matches any of the exemplar prints based on the comparing the first tree to the first plurality of predetermined trees.

For the purpose of this disclosure, the term "print" encompasses fingerprints, palm prints, toe prints, and footprints, and includes latent prints, impressed prints, patent prints, and actual prints.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced. Embodiments of the present invention will now be described, by way of example only, with reference to the following figures in which.

DETAILED DESCRIPTION

The following embodiments are provided as examples only, and are not intended to limit the scope of protection.

Although the following description primarily discusses use of the invention to analyse images of latent fingerprints and latent palm prints, it will be appreciated that the methods and apparatuses discussed herein can be applied to any image including friction ridge patterns, including latent, impressed and patent prints, made by human fingers, palms, toes and feet. The methods and apparatuses discussed herein can also be applied to images including a human finger, palm, toe and/or foot. For the avoidance of doubt, all references herein to fingers are intended to encompass thumbs, and similarly reference to fingerprints are intended to encompass thumb prints.

Exemplary Computing System

Figure 1:
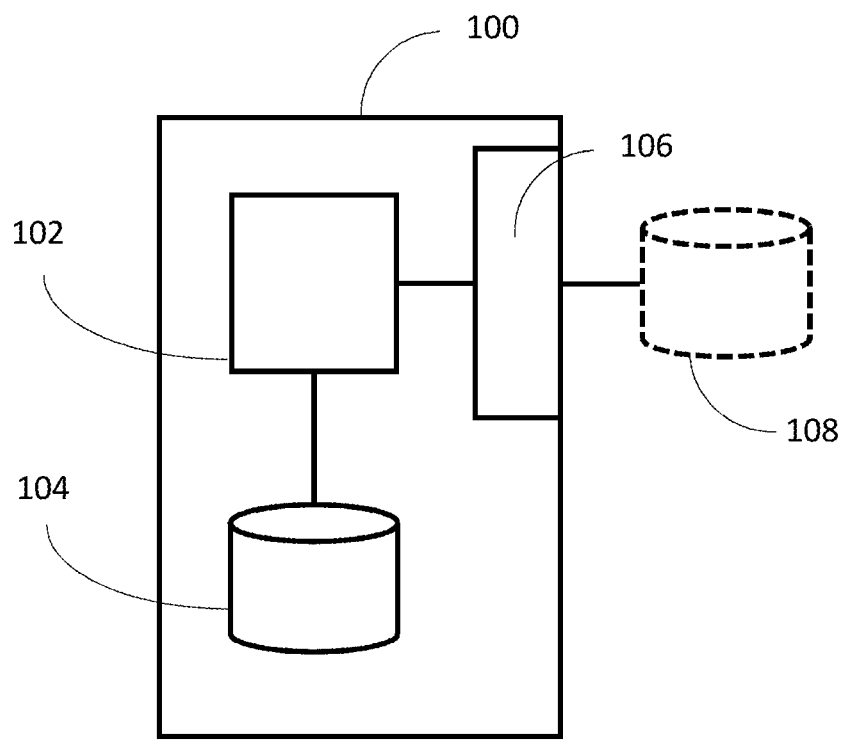
FIG. 1 shows a schematic representation of an exemplary electronic computing device.

FIG. 1 shows a schematic representation of an exemplary electronic computing device 100 that can be used to implement the techniques discussed herein. The electronic device 100 comprises a processor 102 and a memory 104. The computing device preferably further comprises a communications interface 106 configured to receive data from external sources (not shown).

The memory 104 is preferably a non-transitory computer readable medium, which stores one or more executable instructions. The processor 102 is configured to execute the instructions stored on the memory 102.

Alternatively, or in addition, there is provided an optional external computer readable medium 108 that stores the one or more executable instructions. The processor 102 is optionally configured to receive these instructions (for example via communications interface 106), and execute the instructions.

The computing device 100 may be any suitable computing device such as a desktop computer, laptop computer, tablet device etc. The electronic device 100 may further comprise a series of devices, for example executing the method described using known parallel computing techniques.

Orientation Analysis

Figure 2:
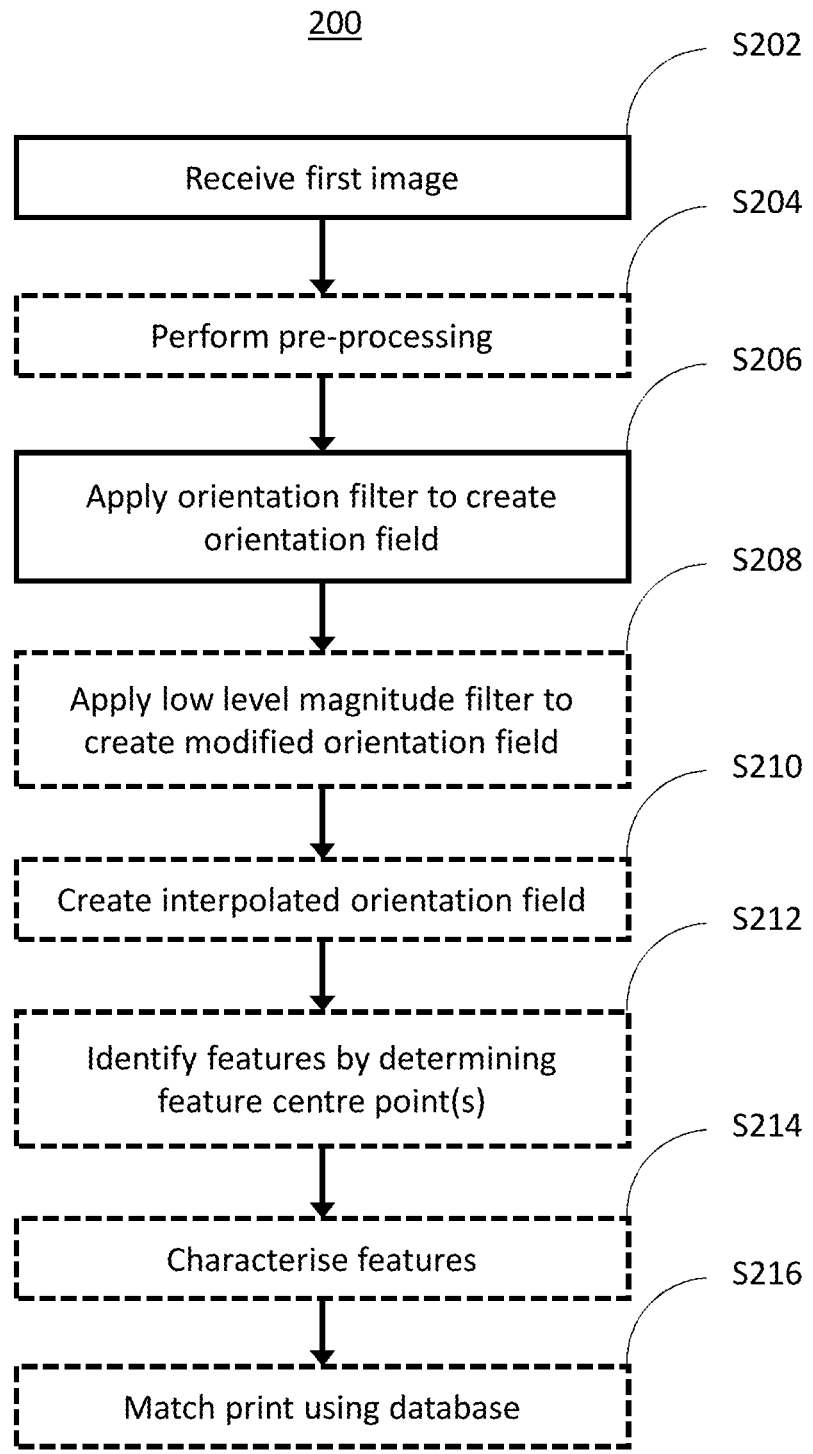
FIG. 2 shows a flow chart of a method of analysing a print in accordance with an embodiment of the present invention.

FIG. 2 shows a flow chart of a method 200 of analysing a print in accordance with a preferred embodiment of the present invention. The method of FIG. 2 is envisaged to be performed using a computing device such as the device 100 shown in FIG. 1. The method 200 may also be embodied as instructions stored on a non-transitory computer readable medium, such as memory 104 or non-transitory computer readable medium 108 shown in FIG. 1.

The method 200 begins at step S202, in which a first image containing at least a portion of a print is received at the electronic device 100. The first image can be received from any suitable source, for example an external storage device, a scanner, a fingerprint sensor, a digital camera, or other image capture device. The first image is preferably received via the communication interface 106. The first image can be an image of a latent print, a patent print, an impressed print, or a portion of a human including characteristic friction ridges (for example a finger, a palm, a toe or a foot). The first image contains features corresponding to a plurality of friction ridges of one or more of a finger, a palm, a toe and a foot.

Optionally, the method proceeds to step S204 in which pre-processing of the image is performed. In one example, the pre-processing involves one or more of converting the image to a greyscale or monotone image, adjusting the contrast of the image, filtering the image using a Gaussian 3 by 3 filter, and filtering the image using a 3 by 3 median filter. Such pre-processing techniques are well-known to the person of ordinary skill in the art. In further embodiments other suitable forms of pre-processing are used.

The method 200 then proceeds to step S206, in which an orientation field is created, the orientation field representing the estimated orientation of features in the first image. An orientation operator is applied to the first image (for example determining the convolution of the operator with the original image), in order to yield an orientation field comprising a plurality of pixels, each pixel having two associated values: an angle and a magnitude. The pixels correspond to locations on the first image, and the angle and the magnitude of each pixel represent the orientation of a part of a feature (for example part of a friction ridge) at that location in the first image. In the preferred embodiment, the orientation operator is based on a plurality of isotropic filters lying in quadrature. Advantageously, it has been found that application of this type of operator both yields accurate orientation estimates and reduces the consumption of processing resources at computing devices (e.g. electronic device 100) as compared to traditional orientation estimation methods. Preferably, the operator is a spherical quadrature filter, which provides both improvements in accuracy and improvements in processing efficiency over traditional methods. In some embodiments, the spherical quadrature filter is of a Gaussian filter type, a monogenic signal filter type, a phase congruency filter type, a Laplacian of Gaussian filter type, a Laplacian of Poisson filter type, a Log Gabor filter type, or a combination thereof. Such filters are known in the art.

Spherical quadrature filters SQF(u, v, σ) can be generally defined by the formula:

$$SQF(u, v, \sigma) = \begin{bmatrix} u \\ v \end{bmatrix} f(u, v, \sigma)$$

wherein u and v are coordinates of a feature of the image in the frequency domain satisfying the condition $(u, v) \in \mathbb{R}^2$, σ is a variable that controls the scale of the filter, and f(u, v, σ) is a given distribution. Specific types of spherical quadrature filter suitable for use in the present invention include:

Gaussian filters G (u, v, σ) of the general form:

$$G(u, v, \sigma) = \begin{bmatrix} u \\ v \end{bmatrix} e^{-\left(\frac{u^2+v^2}{\sigma^2}\right)}$$

Poisson filters P(u, v, σ) of the general form:

$$P(u, v, \sigma) = \begin{bmatrix} u \\ v \end{bmatrix} \frac{1}{2\pi(u^2+v^2+\sigma^2)^{\frac{1}{2}}}$$

Derivative Gaussian filters ∂G (u, v, σ) of the general form:

$$\partial G(u, v, \sigma) = \begin{bmatrix} u \\ v \end{bmatrix} \frac{2e^{-\left(\frac{\sqrt{u^2+v^2}}{\sigma^2}\right)}}{\sigma^2}$$

Derivative Poisson filters ∂P(u, v, σ) of the general form:

$$\partial P(u, v, \sigma) = \begin{bmatrix} u \\ v \end{bmatrix} \frac{3}{2\pi(u^2+v^2+\sigma^2)^{\frac{3}{2}}}$$

Laplacian of Gaussian filters of the general form:

$$\Delta G(u, v, \sigma) = \begin{bmatrix} u \\ v \end{bmatrix} \frac{\left(1 - \frac{u^2+v^2}{2\sigma^2}\right) e^{-\left(\frac{u^2+v^2}{2\sigma^2}\right)} - e^{-\left(\frac{u^2+v^2}{\sigma^2}\right)}}{2\pi\sigma^2}$$

Laplacian of Poisson filters ΔP(u, v, σ) of the general form:

$$\Delta P(u, v, \sigma)_u = \frac{-30u}{\pi(u^2+v^2+\sigma^2)^{\frac{7}{2}}} + \frac{52.5uv^2}{\pi(u^2+v^2+\sigma^2)^{\frac{9}{2}}} + \frac{52.5u^3}{\pi(u^2+v^2+\sigma^2)^{\frac{9}{2}}}$$

and $$\Delta P(u, v, \sigma)_v = \frac{30v}{\pi(u^2+v^2+\sigma^2)^{\frac{7}{2}}} - \frac{52.5u^2v}{\pi(u^2+v^2+\sigma^2)^{\frac{9}{2}}} - \frac{52.5v^3}{\pi(u^2+v^2+\sigma^2)^{\frac{9}{2}}}$$

Log Gabor filters LG(u, v, σ) of the general form:

$$LG(u, v, \sigma) = -\begin{bmatrix} u \\ v \end{bmatrix} e^{-\left(\log\left(\frac{\sqrt{u^2+v^2}}{\sigma^2}\right)\right)^2}$$

Derivative of Log Gabor filters ∂LG(u, v, σ) of the general form:

$$\partial LG(u, v, \sigma) = -\begin{bmatrix} u \\ v \end{bmatrix} \frac{e^{-\left(\log\left(\frac{\sqrt{u^2+v^2}}{\sigma^2}\right)\right)^2} \log\left(\frac{\sqrt{u^2+v^2}}{\sigma^2}\right)^2}{u^2+v^2}$$

In some examples, the method 200 then ends, and the determined orientation field can be provided to other programs or electronic devices for further analysis. Alternatively, the method 200 includes further optional steps for processing and/or analysing the print based on the orientation field as described below.

In the preferred embodiment, a difference of Gaussian filter in particular is used, advantageously, this type of SQF filter has been found to produce highly accurate orientation estimates when its value of σ is tuned to the frequency of the friction ridges in the print (particularly when the print has a resolution of around 500 pixels per inch)

Optionally, after performing step S206, the method 200 proceeds to step S208, in which a low level magnitude filter is applied to the orientation field. In one example, the low level magnitude filter calculates values for each pixel in the orientation field using local circular statistics, and these values are compared to a threshold. The values may include one or more of a local weighted circular mean, circular variance, skew, kurtosis, and quantities calculated using the forgoing values. These values are calculated for each pixel, and are preferably based on orientation values for the pixel and a number of nearest neighbour pixels surrounding the pixel. The determined values are compared to one or more predefined thresholds—if the values exceed a threshold, the pixel is removed from the orientation field. This process is repeated for all the pixels in the orientation field, and when complete leaves a modified orientation field comprising a subset of the pixels of the original orientation field. In some embodiments, the local weighted circular mean, circular variance, skew, kurtosis are used to define a mask that is applied to each pixel in the orientation field, to identify which pixels should be removed. Advantageously, applying the low level magnitude filter removes pixels from the orientation field that correspond to less reliable estimates (for example pixels corresponding to features that are part of level II or level III detail). Accordingly, removal of these less reliable estimates improves the ability to perform automatic print matching based on the determined orientations.

If step S208 is performed, preferably step S210 is also performed, in which the modified image is interpolated. The interpolation comprises determining interpolated pixels based on the modified orientation field to replace the pixels removed from the original orientation field. This results in the creation of an interpolated orientation field, which corresponds to the original orientation field except in that pixels corresponding to level II and level III detail have been removed and replaced with interpolated pixels. Preferably, the interpolation is performed using region growing algorithms, for example iterative algorithm based on circular statistics of nearest neighbours for each pixel in the modified orientation field. Optionally the pixels in the interpolated orientation field are further refined by iteratively applying the circular mean (wherein the individual pixels are weighted according to their variance) to each pixel. Advantageously this reduces the effect of any large local deviation and can be used to fill in any remaining gaps in the interpolated orientation field.

In particular, the interpolation may be performed using a first and/or second algorithm, hereinafter referred to as "Growing 4 Connected" (G4C) and/or "Growing from Local Circular Statistics" (GLCS) algorithms. The G4C algorithm operates as follows: if any empty/missing orientation estimate has valid 4-connected orientation estimates then a circular average is calculated; if the circular variance of this average is below a predetermined threshold, the circular average is inserted into the corresponding empty/missing space. Put differently, the G4C algorithm is an iterative process operating upon the orientation field. During each iteration, a NaN is replaced by the circular mean of its 4-connected neighbours, if: a) the NaN is connected to at least 3 of the 4-connected neighbouring pixels; and b) the circular variance of the NaN's 4-connected pixels is below a specified threshold. The stopping criteria is that a complete iteration must have occurred without NaN replacement. The G4C algorithm is as follows (wherein $\theta(x,y)$ is the orientation field):

---

Require: $\theta(r, y)$
Ensure: $\theta(x,y)$
  1:   p = 0
  2:   while sum(valid($\theta$ (x, y))) $\neq$ p do
  3:     mask(x, y)=4C($\theta$ (x, y))   number of valid 4 connected components
  4:     for i in 1:x do
  5:       for j in 1:y do
  6:         if mask(i,j)>2 then
  7:           $\theta_n$ = $\theta$ (i + 1, j + 1), $\theta$ (i + 1, j − 1), $\theta$ (i − 1, j + 1), $\theta$ (i − 1, j − 1)
  8:           a = cos($\theta_n$)
  9:           b = sin($\theta_n$)
10:           if $\frac{|\theta_n|}{\sqrt{a^2+b^2}}$ > 0.999 then
11:             $\theta$ (i,j) =atan2(b, a)mod$\pi$
12:           end if
13:         end if
14:       end for
15:     end for
16:     p=sum(valid($\theta$ (x,y)))
17: end while

---

The GLCS algorithm operates as follows: If any empty/missing orientation estimates have enough orientation estimates within a certain radius, then a circular average is calculated of these values; if the circular variance of this average is below a predetermined threshold, the circular average is inserted into the corresponding empty/missing space. In the preferred embodiment, both G4C and GLCS algorithms are performed preferably with GLCS applied after G4C is applied. Advantageously G4C inserts orientation estimates in small holes and GLCS inserts orientation estimates in larger empty spaces/voids. In one example, the GLCS algorithm applies iterations of LCS to the result of G4C, for a small region of r=1 and for n=1. If central pixel of the region is a NaN and the region has a variance below a specified threshold, the central pixel is replaced by the circular mean of the region. The stopping criteria is that a complete iteration must have occurred without NaN replacement. The GLCS algorithm is as follows:

---

Require: $\theta(x, y)$
Ensure: $\theta$ (x, y)
  1: LSC= LSC($\theta$ (x, y), n = 1, r = 1)   Unweighted
  2: mask(x, y)=empty($\theta$ (x, y))   Empty pixels in $\theta$ (x, y)
  3: for i in 1:x do
  4:   for j in 1:y do
  5:     if mask(i,j) and (LSC$_R$ (i, j) > 0.999) then
  6:       $\theta$ (i, j) =LSC$_\theta$ (i,j)
  7:     end if
  8:   end for
  9: end for
10: p=sum(valid($\theta$ (x,y)))

---

Applying these algorithms in sequence iteratively until the whole print is filled produces very accurate orientation estimates across the entire print surface.

The interpolation described above is also discussed in "Feature Extraction and Matching of Palmprints Using Level I Detail" (P. Kitching 16 Mar. 2017, http://hdl.handle.net/2436/620419), which is incorporated herein by reference in its entirety.

Optionally, the orientation field (or, if steps S208 and S210 are performed, the interpolated orientation field) can be used for feature identification and analysis as described below in relation to steps S212 and S214.

In step S212, the local circular variance of the orientation field (or interpolated orientation field) at each pixel is calculated. For example, for each pixel, the circular variance of the pixel and a group of nearest neighbour pixels (e.g. pixels within a first radius of the pixel in question, such as a radius of 3 pixels) is calculated and the calculated value assigned to the pixel. Preferably, the calculated values are then compared to a threshold circular variance value. In some embodiments the threshold circular variance value is 0.9. Regions of the orientation field/interpolated orientation field having local circular variance values exceeding the threshold are then identified. Advantageously, the identified regions in the orientation field correspond to areas of the first image containing level I features, and therefore step S212 is able to identify level I features of the print. Preferably, a center point of each of the features is also identified. In some examples, the center point of a feature is identified by determining a geometric center of the region having the local circular variance exceeding the threshold. More preferably, the center point of each feature is determined by recalculating the local circular variance at each pixel within the region—again, the circular variance of the pixel and a group of nearest neighbour pixels is calculated, this time using a second radius smaller than the first radius (for example a radius of 1 pixel), and any pixels having a higher variance than a second threshold (for example a threshold of 0.9) are identified as center points. This second option advantageously provides a more accurate determination of the center point of the feature.

Once the center point of each feature has been identified, the features are optionally characterised at step S214. Preferably, the pixels in the orientation field/interpolated orientation field surrounding the center point are analysed, to determine how many friction ridges are exiting the center point. For example, a circular (i.e. $2\pi$ radian) sweep around the center point in the orientation field/interpolated orientation field can be performed, to identify pixels where the orientation value is substantially parallel to the current orientation of the sweep. This is shown schematically in FIGS. 3A and 3B.

Figure 3A:
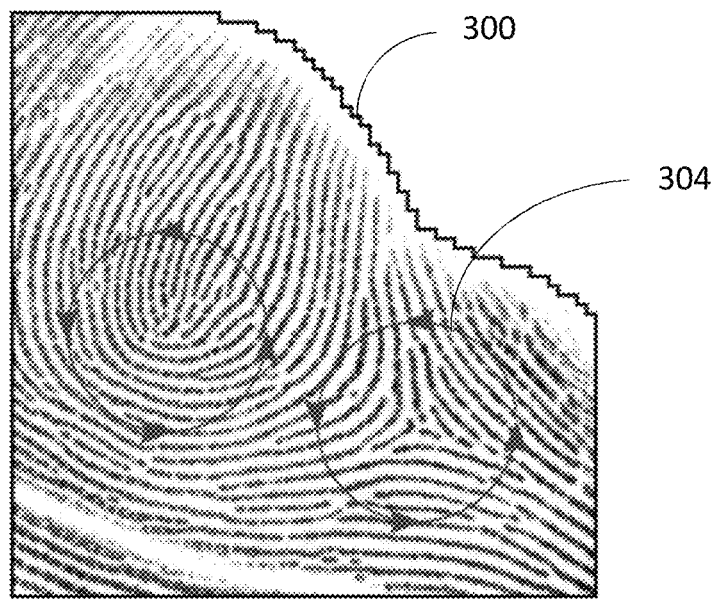
FIG. 3A is an image of an exemplary latent print.
Figure 3B:
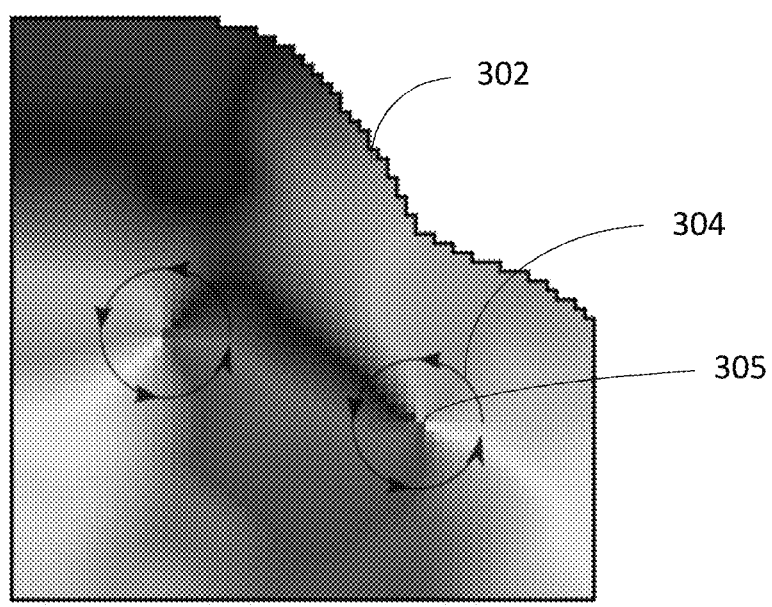
FIG. 3B shows an orientation field of the latent print of FIG. 3A derived in accordance with an embodiment of the invention.

FIG. 3A shows the friction ridges of a latent print 300. FIG. 3B shows the orientation field 302 (derived using the techniques described above) for the latent print 300. FIG. 3B shows the circular sweep 304 being performed about a center point 305 determined using the techniques discussed above. FIG. 3A shows how this circular sweep 304 corresponds to examining the friction ridges on the latent print 300 itself. The number of points at which this occurs over the $2\pi$ radian sweep indicates the number of friction ridges leaving the center point. The features can then be classified based on the number of friction ridges leaving the center point: if the number is 3, then the feature is classified as a delta; if the number is 1, then the feature is classified as a loop; and if the number is 0, then the feature is classified as a whorl.

The sweep is preferably defined as a list $\theta_{2\pi}(n)$ and has a length of n=128. So, $\theta_{2\pi}(n)$ is a set of axial data which represents the values of the orientation field collected in a circular sweep starting at the three o'clock point, and sweeping counter clockwise, a full $2\pi$ back to its starting position. Given a structure's center point (x, y), the coordinates of the circular sweep are:

$$\theta_{2\pi x}(n) = x + r_1 \cos\left(\frac{2\pi n}{128}\right)$$

$$\theta_{2\pi y}(n) = y + r_1 \sin\left(\frac{2\pi n}{128}\right)$$

Where $r_1=4$ is the radius of the sweep, $\theta_{2\pi x}$ and $\theta_{2\pi y}$ are the coordinates in the x and y directions respectively. The orientation estimates about each of the structures are now collected from the orientation field $\theta_{2\pi}(n) = \hat{\theta}(\theta_{2\pi x}(n); \theta_{2\pi x}(n))$. $\theta_{2\pi}(n)$ is then preferably plotted against the direction of the circular sweep, and orientation of the circular sweep as perpendicular, axial, data (denoted $s_o$) is also plotted. The points at which the plotted lines intersect represents the points at which the friction ridges are perpendicular to the orientation of the sweep. Points of intersection are where the friction ridge orientation flows directly from the center of the structure. If $s_o$ is subtracted from the orientations collected from the sweep (i.e. $\theta_{2\pi}(n)$), a measure of the distance is obtained, which is the directional angular distance in Radians of which the friction ridge deviates from the circular sweep, which is denoted as $fr_\theta$:

$$fr_{\theta(n)} = dad(\theta_\pi - s_o)$$

The characterisation of features as described above is also discussed in "Feature Extraction and Matching of Palmprints Using Level I Detail" (P. Kitching 16 Mar. 2017, http://hdl.handle.net/2436/620419), which is incorporated herein by reference in its entirety.

Optionally, the features can be further classified/characterised by determining the path of the friction ridges in the feature by tracing the path corresponding to each ridge in the orientation field/interpolated orientation field. In one example, a path is traced by selecting a first pixel in the orientation field/interpolated orientation field corresponding to a friction ridge proximate to the determined center point. The first pixel defines the first point in the path. The orientation information of the first pixel is extracted to determine a direction in which the friction ridge is orientated, and used to define a position in the orientation field/interpolated orientation field that is a unit distance away from the first pixel in the determined direction. A second pixel corresponding to the defined position defines the second point in the path. The steps above are then repeated for the second pixel, to define a third pixel and so on, until a path of pixels corresponding to the friction ridge has been produced. Advantageously this path can be generated automatically, and can be used for print matching.

Finally, the characterised features can optionally be used for determining whether the print in the first image matches an exemplar print in step S216. In one example, this involves determining whether the print in the first image matches any of a plurality of exemplar images stored in a database. Such matching may be performed by applying a known path matching algorithm to the characterised features, or more preferably, using one or more of the techniques described below.

It should be noted that FIG. 2 presents steps of method 200 in a certain order. It will be appreciated by one skilled in the art that some steps may be reordered or omitted when implementing the claimed invention.

Tree Representations for Use in Print Matching

An embodiment of the present invention allows for computationally efficient matching of prints to exemplar prints.

Figure 4:
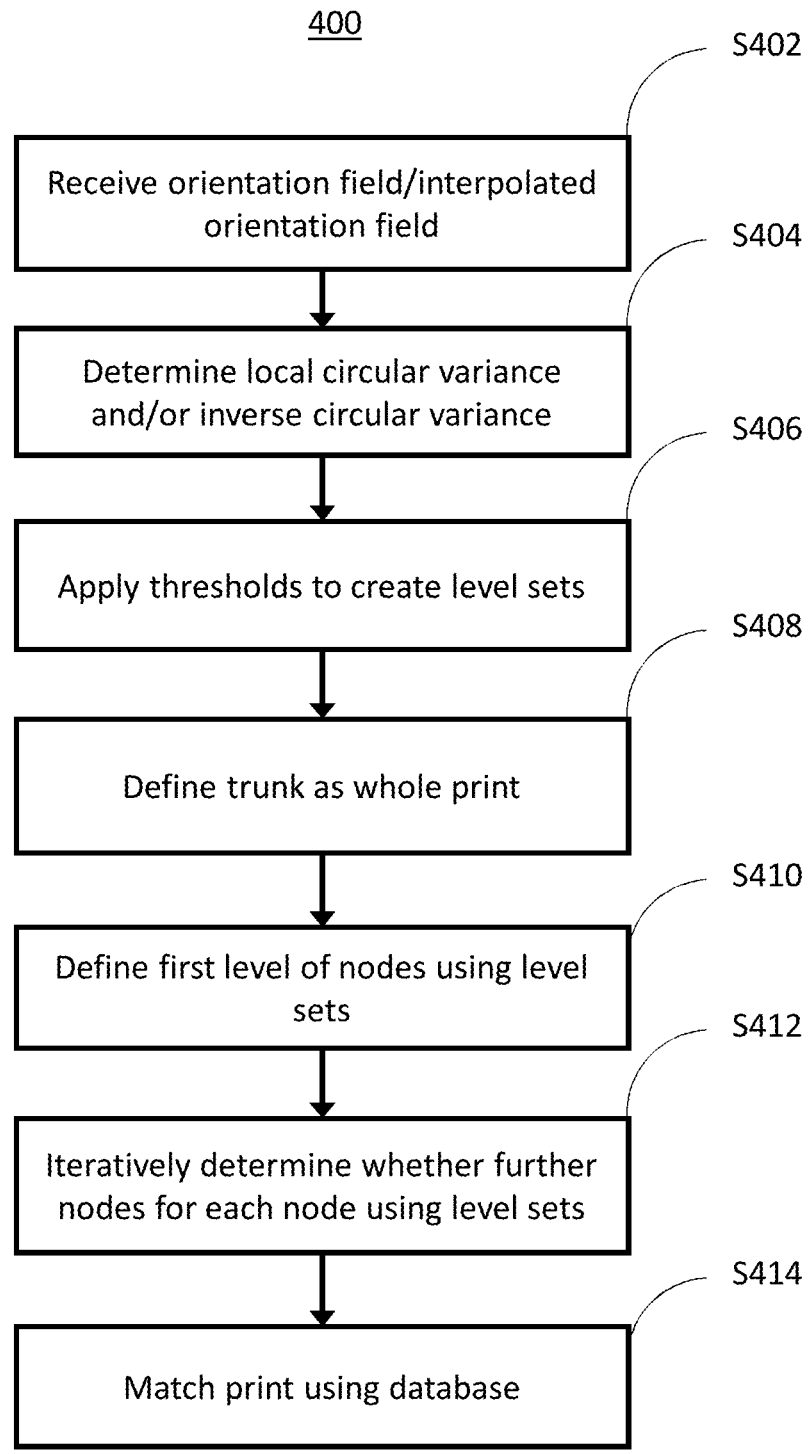
FIG. 4 shows a flow chart of a method for creating a tree representation of a print for use in print matching procedures in accordance with an embodiment of the invention.

FIG. 4 shows a method 400 for creating a tree representation of a print for use in print matching procedures. The method 400 is preferably performed using the exemplary computing system 100 of FIG. 1.

The method 400 begins in step S402, in which an orientation field derived from a print is either created by the computing device 100 (preferably using the techniques described in relation to the method 200 of FIG. 2 above), or received at the computing device 100 (for example via communications interface 106). In the preferred embodiment, an interpolated orientation field is created/received, the interpolated orientation field preferably having been created using the techniques described in relation to the method 200 of FIG. 2 above. Advantageously, use of such an interpolated orientation field minimises the impact of unreliable orientation estimates corresponding to level II or level III detail.

The method 400 proceeds to step S404, in which the local circular variance for each pixel in the orientation field/interpolated orientation field is calculated. For example, for each pixel, the circular variance of the pixel and a group of nearest neighbour pixels (e.g. pixels within a first radius of the pixel in question, such as a radius of 1 pixel, 2 pixels, 3 pixels, etc.) is calculated and the calculated value assigned to the pixel. This creates a map of local circular variance values (of the orientation of friction ridges in the print) corresponding to different locations in the print.

In step S406, the local circular variance values are compared to a series of threshold values. For example, it can be determined which of the local circular variance values $(1-\overline{R})$ lie above threshold values of 0.1, 0.3, 0.5, 0.7 and 0.9. In doing so, regions corresponding to connected regions, in which the circular variance is substantially similar, are identified. These regions are known as level sets. To extract level sets from a circular variance image $1-\overline{R}(i; j)$, in one example a three dimensional array is created, denoted U (i; j; n) where i and j are the number of rows and columns in $1-\overline{R}(i; j)$, respectively and n=100. Then each interval n is defined by $1-\overline{R}(i; j)$ being less than or equal to n/100. Therefore, for each n:

$$U(i, j, n) = 1 - \overline{R}(i, j) \geq \frac{n}{100}$$

A connected component algorithm (as known in the art) is now run over the first interval U(i; j; 1) and any independent regions (i.e isolated 8-connected region) are labelled numerically. Any region which intersects the super set (i.e. the boundary), of the valid palmprint area (i.e U(i; j; 1)), is eliminated. Therefore, an independent region from U(i; j; 1) is a sub level of the boundary of $1-\overline{R}(i; j)$. Thus an independent region in U (i; j; 1) has the potential to contain further sub levels and so can be represented as node within a tree structure.

Figure 5A:
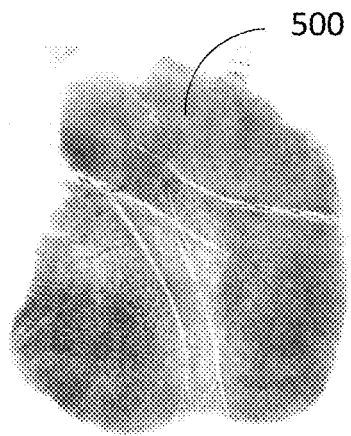
FIG. 5A shows an image of an exemplary print.
Figure 5B:
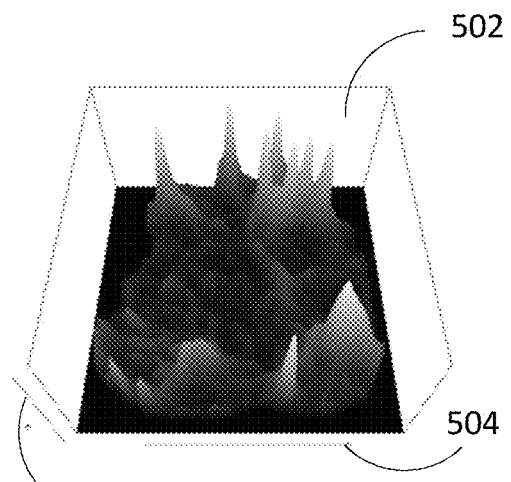
FIG. 5B shows a map of the local circular variance of the print of FIG. 5A.
Figure 5C:
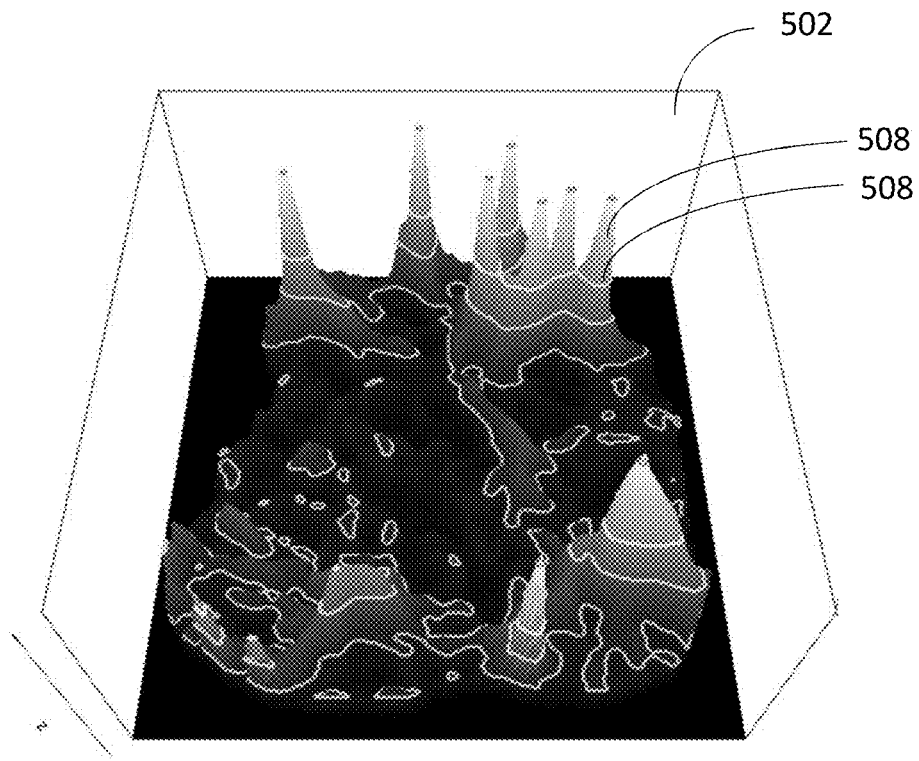
FIG. 5C shows a representation of the creation of level sets on the circular variance map of FIG. 5B, in accordance with the method of FIG. 4.

FIGS. 5A-5C provide a visual representation of the creation of the level sets. FIG. 5A shows a print 500 (in this case a palm print). FIG. 5B shows a map 502 of the local circular variance, wherein the position of each local variance value on the palm print 500 is shown on the x-y plane 504, and the magnitude of the local variance values is plotted against the z-axis 506. Accordingly, the peaks on the map 502 correspond to local maxima in circular variance. FIG. 5C shows a representation of the creation of level sets on the circular variance map 502 of FIG. 5B according to the above process. By categorising each value of local circular variance against a series of thresholds, the values of circular variance falling between respective contours 508 (i.e. contours on the surface defined by the local circular variance values in the map 502) are be grouped into level sets. The level sets therefore represent regions of the circular variance map 502 that have substantially similar values of local circular variance—thus the level sets represent regions of the palm print 500 that can be considered to be substantially homogenous (for example having little differences in the direction of the friction ridges in a particular region defined by a level set).

Returning to step S406, in some embodiments, the image of the print is segmented using the levels sets. For example, the segmentation may use a Waterfall transform or a P-transform (both of which are known in the art).

Once the level sets have been identified in relation to a particular print, then the level sets are used to define a tree representation of the print.

Step S408 represents the first step in creating the tree. In step S408, a "trunk" is defined. The trunk is an initial node for the tree structure, and represents the entire area of the print.

In step S410, it is determined how many level sets are present within the entire area of the print, a set of nodes are then added to (e.g. connected to, or assigned to) the trunk node, each node corresponding to a level set that falls within the entire area of the circular variance map (e.g. the map 502 of FIGS. 5B and 5C).

In step S412, a similar process is performed for each of the nodes. In particular, for the level set corresponding to each node, it is determined how many further level sets fall within the node's level set. If the answer is one or more, then the node is treated as a "branch", to which further nodes are added corresponding to the further levels sets that fall within the level set of the original node. This process is repeated iteratively for each node in the tree, until there are no nodes left corresponding to levels sets that contain further level sets. The nodes that correspond to levels sets containing no other level sets are termed "leaf" nodes.

Figure 6:
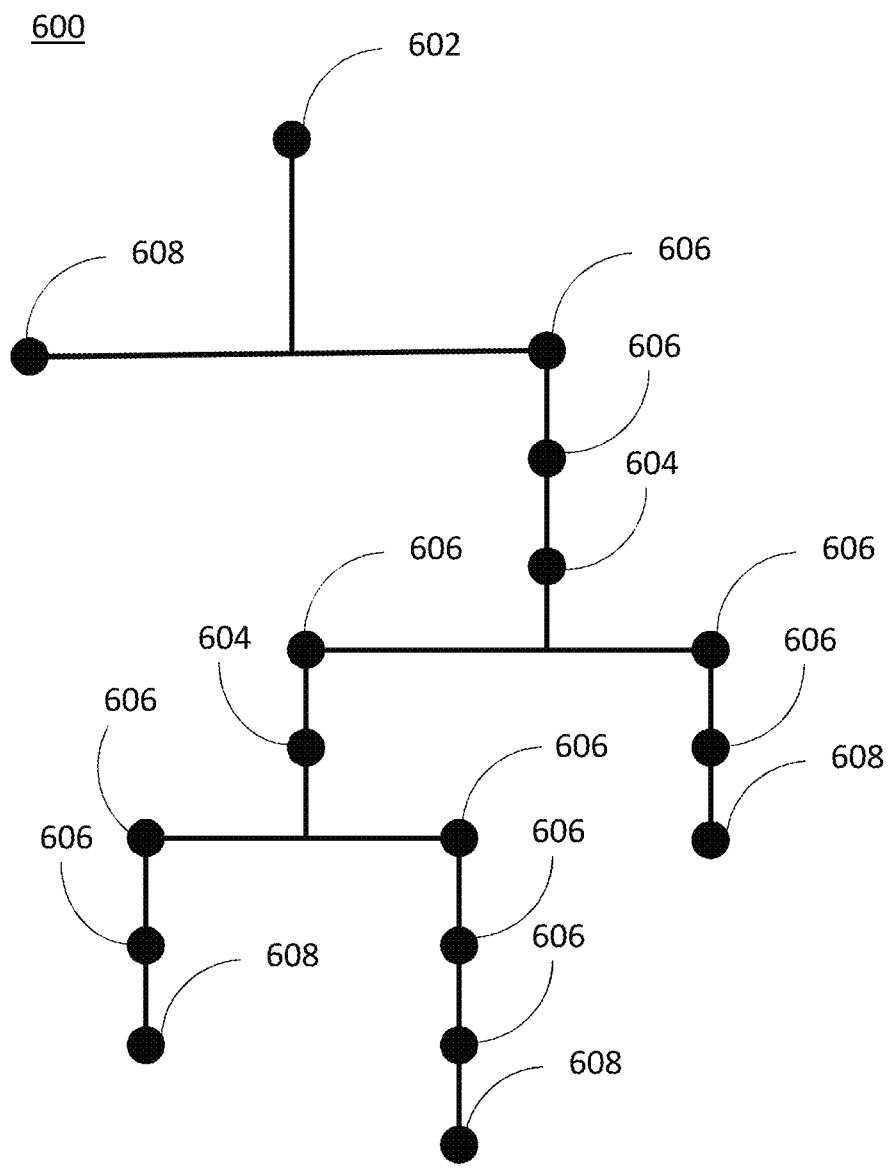
FIG. 6 shows an exemplary tree representation of a print created in accordance with an embodiment of the invention.

FIG. 6 shows an exemplary tree 600 created using the method described above, comprising a trunk 602, and a plurality of nodes 604, 606, 608. In this example, two level sets were contained within the entire print in question, and accordingly the trunk 602 gives rise to two nodes. Some of the nodes 604 correspond to levels sets which have two further level sets lying within them, and thus define branches giving rise to two further nodes. Some of the nodes 606 correspond to levels sets which have only one further level set lying within them, and thus define branches giving rise to one further node. Some of the nodes 608 correspond to levels sets which have no further level sets lying within them, and thus define leaves giving rise to no further nodes.

The tree created during the method 400 represents a simplified structure of the palmar contour map. The leaf nodes represent the peaks of the contour map, the highest of which represent the level I structures (Deltas, Loops and Whorls). In this sense, the tree can be described as an "up" tree.

The same process as described above can also be applied to a map of the inverted local circular variance $(\overline{R})$. In this case, after calculating the local circular variance of the orientation field/interpolated orientation field, the local circular variance is inverted. The subsequent steps of the method 400 are performed in the same manner on the inverted circular variance. In this case, nodes represent lake/crater structures and the leaf nodes represent the deepest areas of these structures contained within the circular variance. In this sense, the tree can be described as a "down" tree. In one embodiment, a down tree is created during the method 400 as well as an up tree.

Thus the up and down trees provides a coarse description of print, reducing the complex structure of the print to a simplified representation.

Optionally, values can be associated with each of the nodes, the values describing properties of the associated level set. For example, each node may be associated with value describing the absolute or relative area of the associated level set. Alternatively, or in addition, a value describing the type of feature (e.g. delta, loop or whorl) associated with each level set can be assigned to corresponding nodes.

Figure 7A:
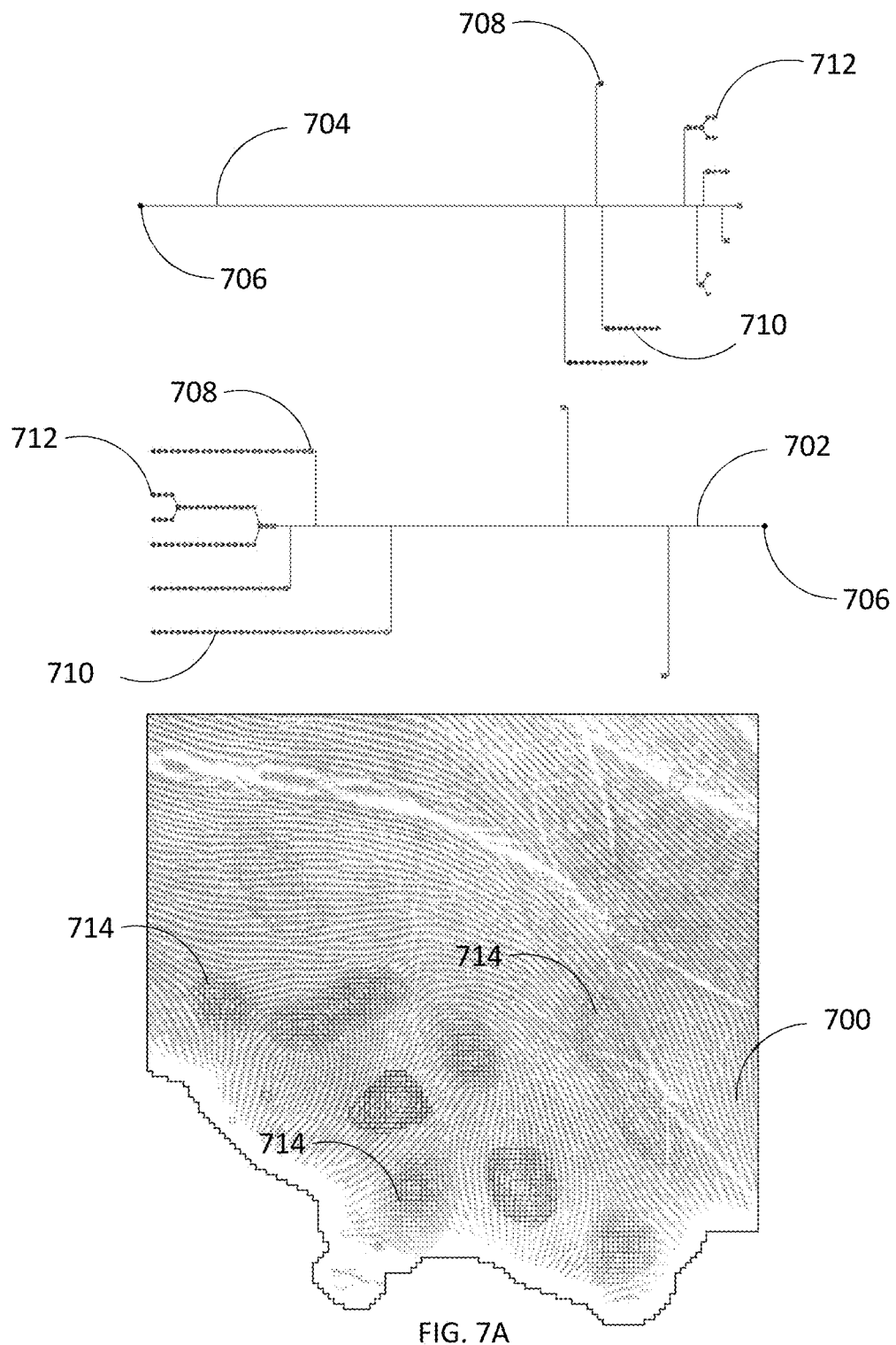
FIGS. 7A and 7B show a specific example of an up tree and a down tree corresponding to a particular image of a palm print.
Figure 7B:
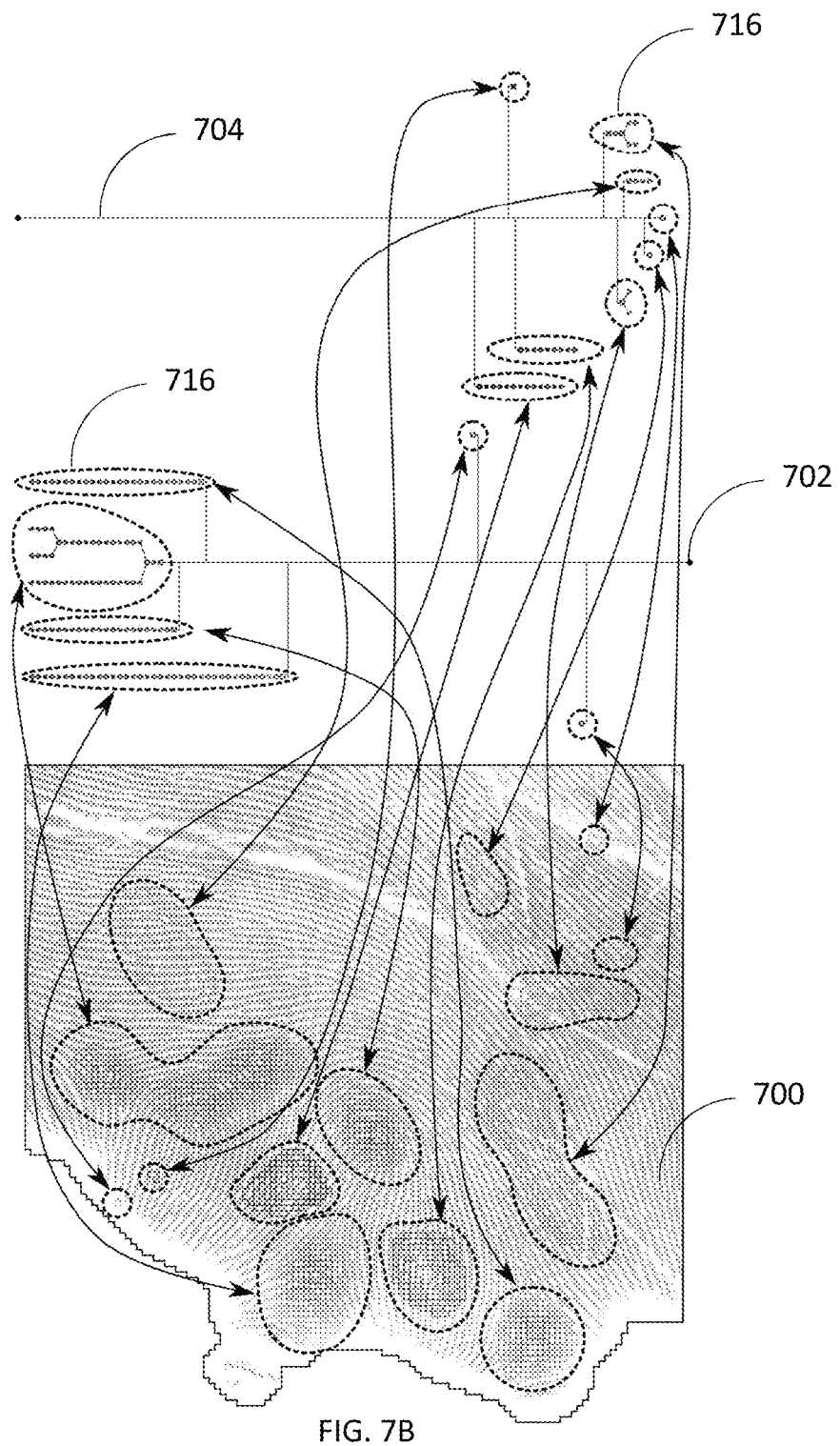

FIGS. 7A and 7B show a specific example of an up tree 702 and a down tree 704 corresponding to a particular image of a palm print 700. The palm print comprises a plurality of regions 714 that correspond to certain features. The up tree 702 and down tree 704 each comprise: a trunk node 706 corresponding to the entire surface of the palm print 700; a plurality of first branch nodes 708 representing a first region which does not intersect the boundary of the print or a branch; a plurality of second branch nodes 710 representing a typical region (i.e. a region defined by a certain level set) that lies within one or the first regions; and a plurality of leaf nodes 712 representing a leaf (a peak in the circular variance/inverted circular variance). FIG. 7B shows the same palm print 700, up tree 702 and down tree 704 as FIG. 7A, with arrows demonstrating how the regions 714 of the palm prints correspond to different branches 716 of the up tree 702 and the down tree 704. We note that some of the reference numerals of FIG. 7A have been omitted in FIG. 7B in the interest of clarity.

The creation of trees using the level set technique described above is also discussed in "Feature Extraction and Matching of Palmprints Using Level I Detail" (P. Kitching 16 Mar. 2017, http://hdl.handle.net/2436/620419), which is incorporated herein by reference in its entirety.

The trees advantageously provide a simplified representation of the structure of the particularly effective means for performing print matching—by representing the structures of the print in this manner, the computational complexity of the matching process is reduced (as discussed below), providing for reduced demand on processing resources.

Returning to FIG. 4, after creating one or both of the up and down trees, the method 400 proceeds to step S414, in which it is determined whether the print in question matches any exemplar prints stored in a database. Preferably, the exemplar prints used in the matching process are analysed in the same manner as the print to be matched—that is to say up and/or down trees are created in the manner above for each of the exemplar prints. To determine whether the print matches any of the exemplar prints, the up and/or down trees corresponding to the print are compared to the up and/or down trees of the exemplar prints. Accordingly, rather than comparing the actual features of the print against features of exemplar prints, the simplified structure of the print is compared to the simplified structure of the exemplar prints using the trees.

Advantageously, by creating trees to represent the structure of the prints/exemplar prints in simplified form, and using the trees to compare the prints/exemplar prints instead of the actual structures of the prints/exemplar prints, significantly less data needs to be analysed during the matching process. This reduction in data load both increases the speed and reduces the demand on processing resources on the computing device 100.

Print Matching

Figure 8:
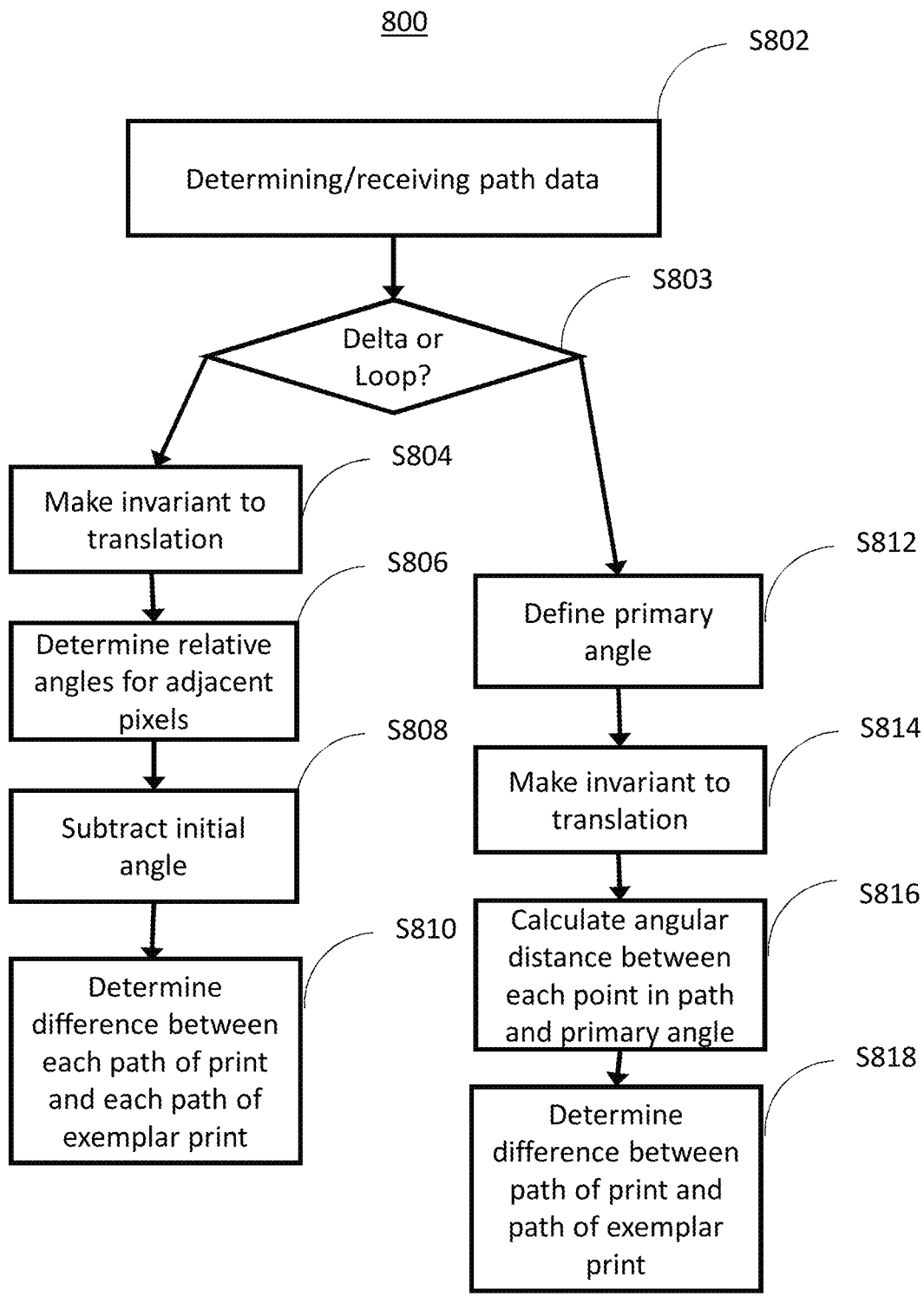
FIG. 8 shows a flow chart of a method for matching level I detail in a print to an exemplar print; and, FIG. 9 shows a flow chart of a method for matching structurally homogeneous regions in a print to an exemplar print.
Figure 9:
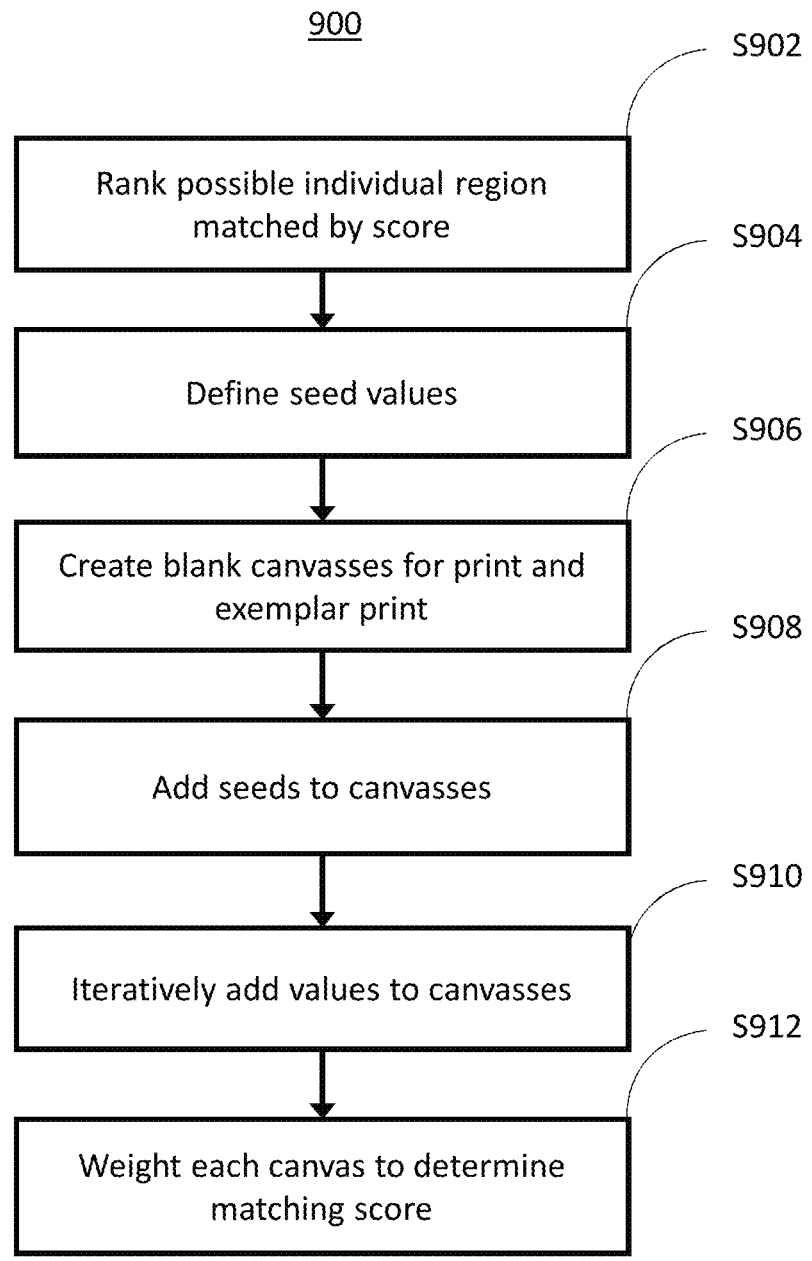

FIGS. 8 and 9 show exemplary methods 800, 900 for matching a print to an exemplar print. The methods 800, 900 may be applied to prints that have been analysed and/or characterised using the techniques described above in relation to FIGS. 2 to 7B. The methods 800, 900 are preferably carried out using computing system 100.

FIG. 8 shows a flow chart of a method 800 for matching level I detail in a print to an exemplar print. The method begins in step S802, in which data describing the path of a friction ridge associated with a level I structure is received by the computing system.

Alternatively, data describing the path of a friction ridge associated with a level I structure is determined using the techniques described above. In brief, one or more paths corresponding to one or more ridges in an orientation field/interpolated orientation field (see above) are traced by selecting a first pixel in the orientation field/interpolated orientation field corresponding to a friction ridge proximate to a determined center point (see above). The first pixel defines the first point in the path, and orientation information of the first pixel is extracted to determine a direction in which the friction ridge is orientated, and used to define a position in the orientation field/interpolated orientation field that is a unit distance away from the first pixel in the determined direction. A second pixel corresponding to the defined position defines the second point in the path. The steps above are then repeated for the second pixel, to define a third pixel and so on, until a path of pixels corresponding to the friction ridge has been produced.

In step S803, it is determined whether the feature is a delta or a loop. This determination is preferably performed using the techniques described above in relation to FIG. 2.

If at step S803 it is determined that the feature is a delta, then the method proceeds to step S804, in which the paths describing the delta (for example paths along friction ridges leaving the center point of the delta) are transformed so as to be translation invariant. Preferably, this involves applying a transform to the data describing each of the paths to create a translation invariant path. For example, if the paths of the delta D are described by $D_{i,n}=(x_{i,n}, y_{i,n})$, wherein i=1, 2, 3 corresponding to each path of the delta, and n=1, 2, . . . m, corresponds to the $n^{th}$ point of a path, which is m points long, the transformation produces transformed data θ according to the equation:

$$\theta_{i,n}(P_{i,n}) = \text{atan } 2((y_{i,n+1}-y_{i,n}),(x_{i,n+1}-x_{i,n})) \in [-\pi,\pi)$$

Following step S804, the method proceeds to step S806, in which a first relative angle between two adjacent points on a path (e.g. two adjacent pixels on the path) is determined. Relative angles are then determined for preferably all of the points (e.g. pixels) on the path. In one example, the relative angles are defined as angles between the portion of the path running between the two adjacent points and a fixed reference direction. The absolute direction of such a fixed reference direction is not important, so long as the same fixed reference direction is the same when calculating the relative angle for each of the pairs of points in the path.

Following step S806, the relative angle for the first pair of points in the path is subtracted from all of the other determined relative angles for the path in step S808. Advantageously, this produces a set of 'circular' data describing invariant features of the print. This allows effective matching of features to exemplar prints even in the case that the exemplar print is rotated with respect to the print being analysed. Put differently, the invariant circular data improves the chance of positively identifying a match between a print and a corresponding exemplar print, even if the print and exemplar print were captured/recorded at different orientations.

After step S808, the method proceeds to step S810, in which the difference between each translation and rotation invariant path of the print and each path of an exemplar print is determined. Preferably the delta paths of the exemplar print have been made translation and rotation invariant in the same manner as the print being analysed as described above. Given the two sets of delta paths (one set for the print being analysed, one set for the exemplar print) a matching metric is calculated by taking angular difference between the points on the respective translation and rotation invariant paths of the print and exemplar print. The lower the value of the matching metric, the better the match. For example, a value of zero would mean that the translation and rotation invariant paths of the print being analysed and exemplar print are identical. In one example the metric is defined as:

$$\lambda(\overline{\theta}_{3,n}(E\lambda), \overline{\theta}_{3,n,1}(L\lambda)) = \frac{1}{\pi m}\sum (\pi - |\pi - |\overline{\theta}_{3,n}(E\lambda) - \overline{\theta}_{3,n,1}(L\lambda)||) \in [0, 1]$$

wherein $\theta_{i,n}(L\lambda)$ is the orientation of the delta in the print being analysed, $\overline{\theta}_{i,n}(E\lambda)$ is the orientation of the delta in an exemplar print, and m is the cardinality of the orientations. The metric is zero for an exact match. The matching process is performed three times (one for each rotation). The final score is then preferably calculated by taking the minimum of the individual scores (i.e. the best match), as defined below:

$$\overline{\lambda}(\overline{\theta}_{3,n}(E\lambda), \overline{\theta}_{3,n,j}(L\lambda)) = \min\begin{pmatrix}\overline{\theta}_{3,n}(E\lambda), \overline{\theta}_{3,n,1}(L\lambda)\\ \overline{\theta}_{3,n}(E\lambda), \overline{\theta}_{3,n,2}(L\lambda)\\ \overline{\theta}_{3,n}(E\lambda), \overline{\theta}_{3,n,3}(L\lambda)\end{pmatrix}$$

If at step S803 it is instead determined that the feature is a loop, then the method proceeds to step S812, in which a primary angle is defined. The primary angle is defined to be the angle subtended by the single friction ridge which flows directly out from the center of the loop (e.g. from a center point as defined above) and a zero direction.

Following step S812, the method proceeds to step S814 in which a path in the loop is made invariant to translation in the same manner as defined above in relation to deltas in step S804. This results in a translation invariant path.

After step S814, an angular distance between each point in the translation invariant path and a normalised primary angle is calculated in step S816, wherein the normalised primary angle is defined as π minus the primary angle. Advantageously, this process makes the translation invariant path invariant to rotation as well.

After step S816 the method proceeds to step S818, in which the difference between the translation and rotation invariant path of the print and the path of an exemplar print is determined. Preferably, the loop path of the exemplar print has been made translation and rotation invariant in the same manner as for the print being analysed as described above. Given the two loop paths (one for the print being analysed, one for the exemplar print) a matching metric is calculated by taking angular difference between the points on the respective translation and rotation invariant paths of the print and exemplar print. The lower the value of the matching metric, the better the match. For example, a value of zero would mean that the translation and rotation invariant paths of the print being analysed and exemplar print are identical. The matching metric is preferably identical to that described above in relation to step S808, however need only be applied once.

Advantageously, the method 800 of FIG. 8 provides an effective, computer implemented technique of matching specific features in a print to an exemplar print, wherein the features have been identified and characterised as described above in relation to the method 200 of FIG. 2.

The matching processes described above is also discussed in "Feature Extraction and Matching of Palmprints Using Level I Detail" (P. Kitching 16 Mar. 2017, http://hdl.handle.net/2436/620419), which is incorporated herein by reference in its entirety.

FIG. 9 shows a flow chart of a method 900 for matching structurally homogeneous regions in a print to an exemplar print, and uses tree representations of a print as described above in relation to FIGS. 4 to 7B. In summary, given the regional features as defined in trees for a print being analysed and a single exemplar print, the features in the print are matched against those of the exemplar print to form a ranked list. The method 900 takes the ranked list and beginning with the candidate with the best score, iteratively adds regions to a 'canvas' for the print being analysed and exemplar regions to an exemplar 'canvas'. Eventually, the exemplar canvas contains all the regions from the exemplar print, which best match those of the print being analysed. This exemplar canvas is then matched against the print canvas.

The method 900 begins at step S902 in which possible individual region matches are ranked by score. The matching procedure begins by isolating candidate regions within the exemplar print, according to their variance. If the variance of a candidate is within a given interval, the candidate is processed further. The variance of an individual region corresponds to its height within the tree. Therefore, this process is efficiently implemented by indexing into the corresponding tree. Further processing may be performed upon the candidate. The candidates are then ranked according to their combined up tree and down tree scores.

In step S904 the combined up tree and down tree scores for each candidate region are compared to a predefined threshold. If the combined score is greater than the predefined threshold, the candidate is classified as a seed, to produce a print seed and exemplar seed pair. The characteristics of the seed region are used later to guide which further matched regions are to be added to the canvas.

In some examples, the ranking is performed using the following algorithm:

Require: $L_{ur,m}$, $L_{dr,n}$, $E_{ur,i}$ and $E_{dr,j}$ ▷ Sets of up and down region statistics for latent and exemplar, of length m, n, i and j, respectively.

```
1     Ensure: S_l and S_e        ▷Lists of matched region pairs
2   for i in l:m do
3     for j in l:n do
4       if |Level(L_{ur,m}) – Level(E_{ur,n})| < 6 then
5         M = urm (L_{ur,m}, E_{ur,m})
6         S_l= L_{ur,m}, M
7         S_e E_{ur,n}, M
8       end if
9     end for
10  end for
11  for t in 1 :p do
12    for j in l:q do
13      if | Level(L_{dr,i}) – Level(E_{dr,j})| < 6 then
14        M = urm (L_{ur,m}, E_{ur,m})
15        S_l= L_{dr,i}, M
16        S_e = E_{dr,j}, M
17      end if
18    end for
19  end for
    Order S_l and S_e by M
``` wherein the up and down region statistics of the print being analysed (e.g. a latent print) are denoted as $L_{ur}$ and $L_{dr}$, and the exemplar up and down region statistics as $E_{ur}$ and $E_{dr}$, respectively. The algorithm begins by creating two empty lists $S_l$ and $S_e$ to contain candidate latent and exemplar region pairs. These lists are filled with candidates in the following manner.

For each region in $L_{ur}$, if any region in $E_{ur}$ exists within +/−6 levels of the print's region position within the tree, then the features of the two regions are matched using the metric defined by:

$$urm(L_{ur}, E_{ur}) = \frac{1}{4}(\Psi_{area}(a, b) + \Psi_{perimeter}(a, b) + \Psi_R(a, b) + \Psi_h(a, b))$$

wherein $$\Psi_f(a, b) = \frac{\min(a, b)}{\max(a, b)}$$

and wherein f corresponds to the feature in question, and a and b are the scalar values of the feature. The features of the two lists are then placed in the lists $S_l$ and $S_e$, together with their scores. The process is repeated for the down tree region (i.e. $L_{dr}$ and $E_{dr}$) using the metric defined by:

$$drm(L_{dr}, E_{dr}) =$$
$$\frac{1}{5}(\Psi_{area}(a, b) + \Psi_{perimeter}(a, b) + \Psi_R(a, b) + \Psi_h(a, b) + \Psi_\sigma(a,))$$

The resulting lists of $S_l$ and $S_e$ of paired candidate matches are then ordered according to the individual scores. It should be noted that a region may match more than one other region and therefore, appear in $S_l$ and $S_e$ more than once.

In step S906, a pair of 'canvasses' are created. A print canvas and an exemplar canvas are created, each being of the same size as the corresponding orientation fields of the print being analysed and the exemplar print. Both canvasses are initially blank (i.e. an array of NaN).

The print and exemplar seeds defined in step S904 are added to the print and exemplar canvasses in step S908.

In step S910 further values are iteratively added to the two canvasses. The next highest ranked region pair after the seed pair are selected, and are temporarily added to their respective canvas. If temporary contents of the canvasses (e.g. the regions) pass predefined criteria, then the contents of the canvasses are made permanent additions. If the predetermined criteria are not satisfied the temporarily added pair are removed from the canvasses. This process is repeated for each of the region pairs in order of descending rank.

In some examples steps S906, S908 and S910 involve using the following algorithm:

```
Require: S_l, S_e pairs                       Ordered lists of region
Ensure: C_l, C_e                              C_l, C_e are the canvasses
 1: Create C_l,α, C_e,α     C/\α, Ce,α are the empty canvasses for seed a
 2: for i in 1: α doSeeds                     >a The number of
 3:    if RIRM(S_{l,i}, S_{e,i}) ≥ 0.95 then
 4:       if Ψarea (C_{l,i}, C_{e,i}) > 0.6 then
 5:          if Every|Ψ_{Hu}(C_{l,i}, C_{e,i})| <0.05 then
 6:             DL_{x,y} = (S_{l,i,x}, S_{l,i,y}) 1
 7:             DE_{x,y} = (S_{e,i,x}, S_{e,i,y}) 2
 8:                DL is a list containing the coordinates of the
                      centroid of S_{l,i}
 9:                DE is a list containing the coordinates of the
                      centroid of S_{e,i}
10:             Remove corresponding regions from S_{l,i} and S_{e,i}³
11:             for j in 1: length(S_{l,i}) do
12:                DLat=√(S_{l,j,x}−DL_x)²+(S_{l,j,y}−DL_y)²
13:                DExe=√(S_{e,j,x}−DE_x)²+(S_{e,j,y}−EL_y)²
14:                D=min(Ψ(DLat,DExe)) D is the min Ψ from all centroids
15:                C_{l,j} = C_l + S_{l,j}     if region S_{l,j} is added to canvas C_{l,j}
16:                C_{e,j} = Ce + S_{e,j}      if region S_{e,j} is added to canvas C_{e,j}
17:                A = Ψ_{area} (C_l, C_e)
18:                V = Ψ_R(C_l, C_e)
19:                Hu= max|Ψ_{Hu}(C_{l,i}, C_{e,i})|
20:                if D ≥0.6 and A >0.9 and V ≥0.95 and Hu ≤ 0.05 then
21:                   C_l = C_{l,j}        make C_{l,j} permanent
22:                   C_e = C_{e,j}        make C_{e,j} permanent
23:                   concatenate (S_{l,j,x}, S_{l,j,y}) to DL_{x,y}
24:                   concatenate (S_{e,x}, S_{e,j,y}) to DE_{x,y}
25:                   Remove corresponding regions from S_{l,i} and S_{e,i}¹
26:                end if
27:             end for
28:          end if
29:       end if
30:    end if
31: end for                Store Final score =C_{l,α} × no. of regions
```

This exemplary algorithm processes the ordered lists of paired matches $S_l$ and $S_e$ and to produce a canvas for matching. The algorithm is potentially time consuming and so there are a nested sequence of criteria (lines 3-5), a failure of any of which will terminate the matching of that particular pair of regions. The first of these criteria rejects the candidate seed region, if its individual matching score is less than 0.95. The second of the criteria, tests whether the difference between the areas of the region pair is less than 40% of the region whose area is largest. The final criterion tests whether maximum absolute difference between the Hu moments of the region pair is less than 5%. These criteria may be expressed as:

$$\Psi area(C_l,C_e)>0.9$$

$$\Psi_R(C_l,C_e)\geq 0.95$$

$$\Psi_{Hu}(C_l,C_e)\leq 0.05$$

The second criteria effectively determines if the size and shape of the region pair is sufficiency similar to warrant further processing. If this is the case, this is performed in lines 6-7 of the exemplary algorithm. If a region pair is accepted on to the canvasses all occurrences of that latent and exemplar regions are removed from $S_l$ and $S_e$ (shown at line 10 and 25). Pre-calculation and storage of the region's centroid takes place in line 8-9, for later use. In lines 11-25, it is determined whether the region pair should be permanently added to the canvasses. Lines 12-19 pre-calculate the values required for a test at line 20, which implements the final criteria for permanent inclusion on the canvasses. These final criteria must, in this example, be fulfilled for a region pair to be permanently placed on their respective canvasses.

Once the canvasses have been completed, the method proceeds to step S912, in which matching takes place. The canvasses for a plurality of prints created as described above with respect to a single exemplar print, and are weighted according to their area and number of regions. This defines a final score for each of the print canvasses. The print canvas with the largest score, is chosen as the best match for the particular exemplar print in question.

Advantageously the method 900 provides a particularly effective means for performing matching using the trees defined above.

The matching processes described above is also discussed in "Feature Extraction and Matching of Palmprints Using Level I Detail" (P. Kitching 16 Mar. 2017, http://hdl.handle.net/2436/620419), which is incorporated herein by reference in its entirety.

In some embodiments, there is provided a computer readable medium storing instructions that, when executed by a processing device, cause the processing device to perform any of the methods described above. The computer readable medium is preferably non-transitory, for example non-volatile memory such as flash, ROM, PROM, EPROM and EEPROM memory.

The above embodiments are provided as examples only. Further aspects of the invention will be understood from the appended claims. It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A computer implemented method for automatic print analysis, the method comprising:
    receiving a first image wherein the first image shows one or more of: a latent print, a patent print, an impressed print, and an actual finger, palm, toe and/or foot; and wherein the first image includes characteristic features of at least one of a finger, a palm, a toe and a foot;
    creating an orientation field by estimating the orientation of one or more features in the first image, wherein the estimating comprises:
        applying an orientation operator to the first image, the orientation operator being based on a plurality of isotropic filters lying in quadrature; and,
        applying a low magnitude filter configured to remove data for pixels in the orientation field corresponding to level II and level III detail, thereby creating a modified orientation field.

2. The computer-implemented method of claim 1, wherein the orientation operator is a spherical quadrature filter.

3. The computer implemented method of claim 2, wherein the spherical quadrature filter is one of: a Difference of Gaussian filter, a Gaussian filter, a monogenic signal filter, a phase congruency filter, a Laplacian of Gaussian filter, a Laplacian of Poisson filter, a Log Gabor filter.

4. The computer implemented method of claim 1, wherein the low magnitude filter is based on one or more values, the one or more values calculated based on the orientation field and comprising at least one of: a local weighted circular mean, a circular variance, a skew and a kurtosis.

5. The computer implemented method of claim 4, wherein the low magnitude filter is configured to remove data in the first image corresponding to portions of the image for which the one or more values exceed one or more predefined thresholds, thereby creating the modified orientation field.

6. The computer implemented method of claim 1 further comprising:
    determining interpolated orientation data for one or more of the pixels in the first image corresponding to level II and level III detail;
    adding the interpolated orientation data to the modified orientation field, thereby creating an interpolated orientation field.

7. The computer implemented method of claim 6 wherein determining the interpolated orientation data comprises applying G4C and GLCS algorithms to the modified orientation field.

8. The computer implemented method of claim 1, further comprising identifying features by:
    calculating a circular variance for each of a plurality of points in the orientation field;
    comparing the calculated circular variances to a predetermined threshold circular variance value; and
    for each calculated circular variance exceeding the predetermined threshold circular variance value, labelling a point in the first image corresponding to the calculated circular variance exceeding the predetermined threshold circular variance value as a center point of a feature.

9. The computer implemented method of claim 8 further comprising classifying features by:
    determining a number of friction ridges leaving a center point based on a set of orientation estimates immediately surrounding the center point; and
        if the determined number of friction ridges is 0, classifying the feature as a whorl;
        if the determined number of friction ridges is 1, classifying the feature as a loop;
        if the determined number of friction ridges is 3, classifying the feature as a delta.

10. The computer implemented method of claim 9, wherein the determining a number of friction ridges leaving a center point based on a set of orientation estimates immediately surrounding the center point comprises:
    performing a circular sweep in the orientation field about the center point to identify one or more pixels of the orientation field having an orientation value parallel to a current orientation of the sweep.

11. The computer implemented method of claim 8 further comprising tracing the path of one or more friction ridges of the feature using the orientation field.

12. A non-transitory computer readable medium storing instructions that, when executed by a processing device, cause the processing device to perform automatic print analysis, by:
    receiving a first image wherein the first image shows one or more of: a latent print, a patent print, an impressed print, and an actual finger, palm, toe and/or foot; and wherein the first image includes characteristic features of at least one of a finger, a palm, a toe and a foot;
    creating an orientation field by estimating the orientation of one or more features in the first image, wherein the estimating comprises:

applying an orientation operator to the first image, the orientation operator being based on a plurality of isotropic filters lying in quadrature; and, applying a low magnitude filter configured to remove data for pixels in the orientation field corresponding to level II and level III detail, thereby creating a modified orientation field.

13. An electronic computing device comprising:

a processor; and a memory;

wherein the memory stores instructions that when executed by the processor, cause the processing device to perform automatic print analysis, by:

receiving a first image wherein the first image shows one or more of: a latent print, a patent print, an impressed print, and an actual finger, palm, toe and/or foot; and wherein the first image includes characteristic features of at least one of a finger, a palm, a toe and a foot;

creating an orientation field by estimating the orientation of one or more features in the first image, wherein the estimating comprises:

applying an orientation operator to the first image, the orientation operator being based on a plurality of isotropic filters lying in quadrature; and, applying a low magnitude filter configured to remove data for pixels in the orientation field corresponding to level II and level III detail, thereby creating a modified orientation field.

* * * * *